United States Patent [19]
Domries

[11] Patent Number: 5,628,373
[45] Date of Patent: May 13, 1997

[54] EARTH WORKING IMPLEMENT

[76] Inventor: Bernard O. Domries, 12277 Road 29, Madera, Calif. 93638

[21] Appl. No.: 527,255

[22] Filed: Sep. 12, 1995

[51] Int. Cl.$^6$ ............................................... A01B 7/00
[52] U.S. Cl. ........................... 172/574; 172/582; 172/585; 172/586
[58] Field of Search ........................ 172/579, 581, 172/582, 584, 585, 586, 593, 574, 576, 441

[56] References Cited

U.S. PATENT DOCUMENTS

| | | | |
|---|---|---|---|
| 1,245,295 | 11/1917 | Willis . | |
| 2,596,579 | 5/1952 | McKay | 172/584 X |
| 2,923,363 | 2/1960 | Thompson | 172/585 X |
| 3,080,931 | 3/1963 | Heckathorn | 172/441 X |
| 3,191,691 | 6/1965 | Newkirk | 172/584 X |
| 3,223,178 | 12/1965 | Clifford et al. | 172/441 X |
| 4,271,912 | 6/1981 | Frye | 172/441 |
| 4,291,770 | 9/1981 | Engler | 172/441 X |
| 4,423,789 | 1/1984 | Anderson et al. . | |
| 4,501,333 | 2/1985 | Domries | 172/441 |
| 5,462,123 | 10/1995 | Harlan et al. | 172/584 X |

FOREIGN PATENT DOCUMENTS 2636804  3/1990  France ................................ 172/584

Primary Examiner—Terry Lee Melius
Assistant Examiner—Christopher J. Novosad
Attorney, Agent, or Firm—Worrel & Worrel

[57] ABSTRACT

An implement having a frame adapted to be transported in earth traversing movement along a predetermined path of travel; a first earth working tool mounted on the frame disposed for engagement with the earth during such earth traversing movement and operable to move earth laterally of the path of travel; a second earth working tool mounted on the frame forwardly of the first earth working tool relative to the path of travel disposed for engagement with the earth during the earth traversing movement and operable to move earth laterally of the path of travel; and a third earth working tool mounted on the frame rearwardly of the first earth working tool relative to the path of travel and disposed for engagement with the earth during such earth traversing movement and operable to move earth laterally of the path of travel and wherein the directions of movement of the earth laterally of the path of travel by the first, second and third earth working tools is such as to work the earth substantially evenly and to return the earth thereafter to a substantially ambient distribution.

10 Claims, 4 Drawing Sheets

EARTH WORKING IMPLEMENT

BACKGROUND OF THE INVENTION

1. Field of the Invention:

The present invention relates to an implement and, more particularly, to such an earth working implement which obviates many of the difficulties associated with the use of conventional earth working devices.

2. Description of the Prior Art:

The prior art relative to earth working implements is replete with a multiplicity of devices broadly intended to perform the same operational objectives. The scope of this prior art is indicative of the fact that conventional devices have been less than completely successful in achieving these operational objectives. For example, the Willis U.S. Pat. No. 1,245,295 issued in 1917 discloses a device which is closely similar in structure and overall operation to the device disclosed by the Anderson et al. U.S. Pat. No. 4,423,789 issued in 1984. Both of these patents are directed to a device which has a center disc gang assembly extending to what can be defined as a full, operative width. There is a front gang assembly which extends laterally to engage approximately the left half of the swath traversed by the device and a rear gang assembly which extends laterally to engage approximately to the right half of the swath traversed by the device. The front and rear gang assemblies are individually disposed along substantially parallel longitudinal axes while the central gang assembly is disposed at an acute angle relative thereto. The disc blades of the central gang assembly are operable to turn the soil to the right relative to the path of travel while the disc blades of the front and rear gang assemblies are adapted to turn the soil to the left relative to the path of travel, but from opposite sides of the longitudinal axis of the device.

The deficiencies inherent in such prior devices can readily be identified by those familiar with their rise, but may not be readily apparent simply upon examination of the devices by those unfamiliar with their operation. Such devices, of course, turn or otherwise disturb the soil within a swath of contact. The broad operational objectives for doing so include the control of plant growth; the improvement of drainage; preparation of the soil for further manipulation such as, for example, the formation of furrows for purposes of irrigation; aesthetic enhancement and the like; and any combination of these broad purposes. In general, the effectiveness of the devices in achieving these objectives may be determined by evaluation relative to several well recognized criteria.

A first criterion is that the soil be worked at depth rather than by means simply of superficial contact. If the soil is not worked thoroughly to a depth well beneath the surface, nothing more than perhaps a cosmetic result is achieved. Without turning of the soil through the medium of the concave disc blades, little or no benefit is attained. For example, unwanted plant life, such as weeds, should preferably be buried beneath a layer of soil so as to accelerate its decomposition while enriching the soil. Similarly, unless the soil is turned, the soil cannot be aerated to any beneficial depth. More importantly in the case of hardened earth, or earth which has not frequently been worked, or earth which contains substantial incursions of rock, hardpan or the like, the soil cannot be reduced to the desired consistency without being worked to an adequate depth. Conventional devices may simply pass over the surface of the earth without any significant penetration and with little beneficial result.

A second criterion is that the soil be worked as thoroughly and evenly as possible so as to be converted to a substantially uniform consistency. This facilitates the subsequent use of the soil, whether for the planting of a new crop, weed control, the subsequent reworking of the soil, or the like. To the extent the soil is not of a substantially uniform consistency, the resulting soil condition may be inadequate for the purposes intended.

A third criterion is that, to the extent possible, the soil after such working be returned to a grade and distribution desired. In normal farming operations, this is a substantially ambient condition. It is desired that the soil is simply worked and then returned to is original grade and distribution. Of course, if subsequent working of the soil is to be performed, such as in the formation of furrows for irrigation or where a land levelling operation is to follow, this may not be as significant. However, in most applications, the optimum result from a single pass with such a device is to turn the soil deeply and thoroughly, as previously noted, and then to return the soil to its ambient grade and distribution so that no further working of the soil is required to achieve this result.

A fourth criterion is that the device itself be readily and dependably adjustable to a multiplicity of adjusted settings for optimum performance of the desired task. This is important in order to permit the device to be adjusted for the particular width of the swath desired, to be able to adjust for the condition of the soil being turned, to be able to adjust for the grade of the ambient soil as well as to permit adjustment for such other variables as the power of the tractor pulling the implement, the topography of the area, and the like.

The prior art, when evaluated against these and other criteria, is deficient in nearly every instance to one degree or another. While some prior art devices may be more effective relative to certain of the criteria, in other respects they are frequently less effective.

Therefore, it has long been known that it would be desirable to have an earth working device which obviates the difficulties associated with the use of conventional earth working equipment; which is operable dependably to work the soil at depth during use thereof; which works the soil thoroughly and evenly to convert the soil to a substantially uniform consistency during a single pass; which returns the soil substantially to its ambient grade and distribution; which is dependably and readily adjusted to particular working configurations; and which is otherwise entirely effective in achieving its desired operational objectives.

SUMMARY OF THE INVENTION

Therefore, it is an object of the present invention to provide an improved earth working implement having particular utility in that it obviates many of the deficiencies associated with the use of conventional earth working equipment.

Another object is to provide such an implement which works the soil at depth during a single pass without the need for a return pass or a pass in the opposite direction in the same swath.

Another object is to provide such an implement which works the soil thoroughly and evenly during a single pass so as to convert the soil to a substantially uniform consistency for subsequent usage.

Another object is to provide such an implement which is capable of returning tile soil after working in a single pass to the ambient grade and distribution so as not to require subsequent reworking of tile soil for the purpose of achieving an ambient condition.

Another object is to provide such an implement which can readily be adjusted to a multiplicity of specific configurations precisely suited to the conditions encountered and the results desired to be achieved.

Another object is to provide such an implement which, while being heavy for purposes of working the soil thoroughly and evenly at depth, is conveniently and dependably adjusted to any desired specific configuration for usage.

Further objects and advantages are to provide improved elements and arrangements thereof in an apparatus for the purpose described which is dependable, economical, durable and fully effective in accomplishing its intended purpose.

These and other objectives and advantages are achieved, in the preferred embodiment of the present invention, in an earth working implement comprising a frame adapted to be transported in earth traversing movement along a predetermined path of travel; a first earth working tool mounted on the frame disposed for engagement with the earth during said earth traversing movement and operable to move earth laterally of said path of travel; a second earth working tool mounted on the frame forwardly of the first earth working tool relative to said path of travel disposed for engagement with the earth during said earth traversing movement and operable to move earth laterally of said path of travel; and a third earth working tool mounted on the frame rearwardly of the first earth working tool relative to said path of travel and disposed for engagement with the earth during said earth traversing movement and operable to move earth laterally of said path of travel and wherein the directions of movement of the earth laterally of said path of travel by the first, second and third earth working tools is such as to work the earth substantially evenly and to return the earth thereafter to a substantially ambient distribution.

DESCRIPTION OF THE PREFERRED EMBODIMENT

Figure 1:
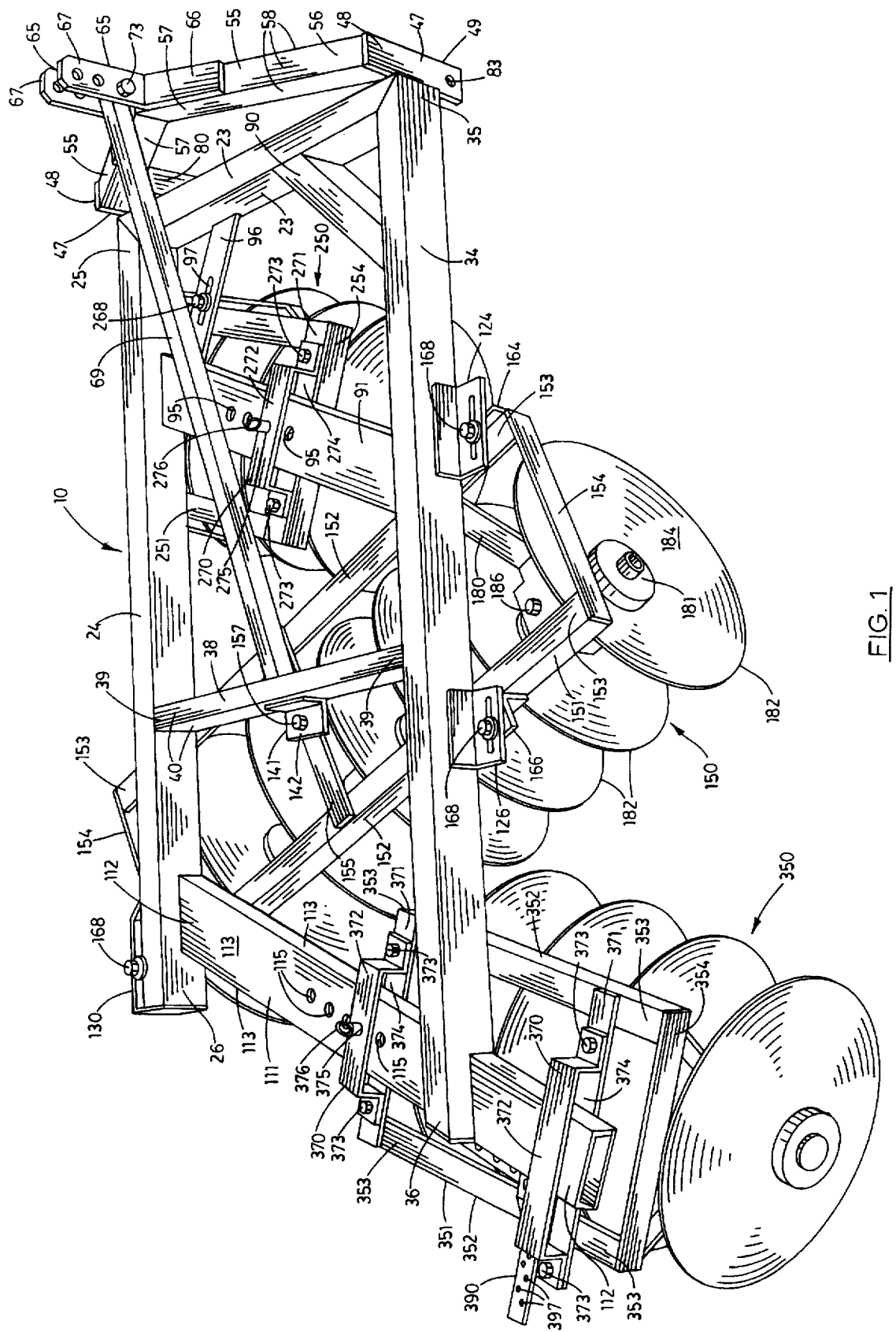
FIG. 1 is a perspective view of the earth working implement of the preferred embodiment of the present invention.

Referring more particularly to the drawings, the earth working implement of the preferred embodiment of the present invention is generally indicated by the numeral 10 in FIG. 1. For illustrative convenience, the surface of the earth is generally indicated in several of the views by the numeral 11. The implement 10 has a main frame 20 which includes a forward transverse frame member 21 having opposite end portions 22. The forward transverse frame member has side surfaces 23. A first longitudinal frame member 24 is mounted on the opposite end portion 22 of the forward transverse frame member 21 by its proximal end portion 25. The first longitudinal frame member extends to a distal end portion 26 and has side surfaces 27. The forward transverse frame member 21 and the first longitudinal frame member 24 are preferably box beams, as shown in the drawings, constructed of heavy gauge steel.

Figure 2:
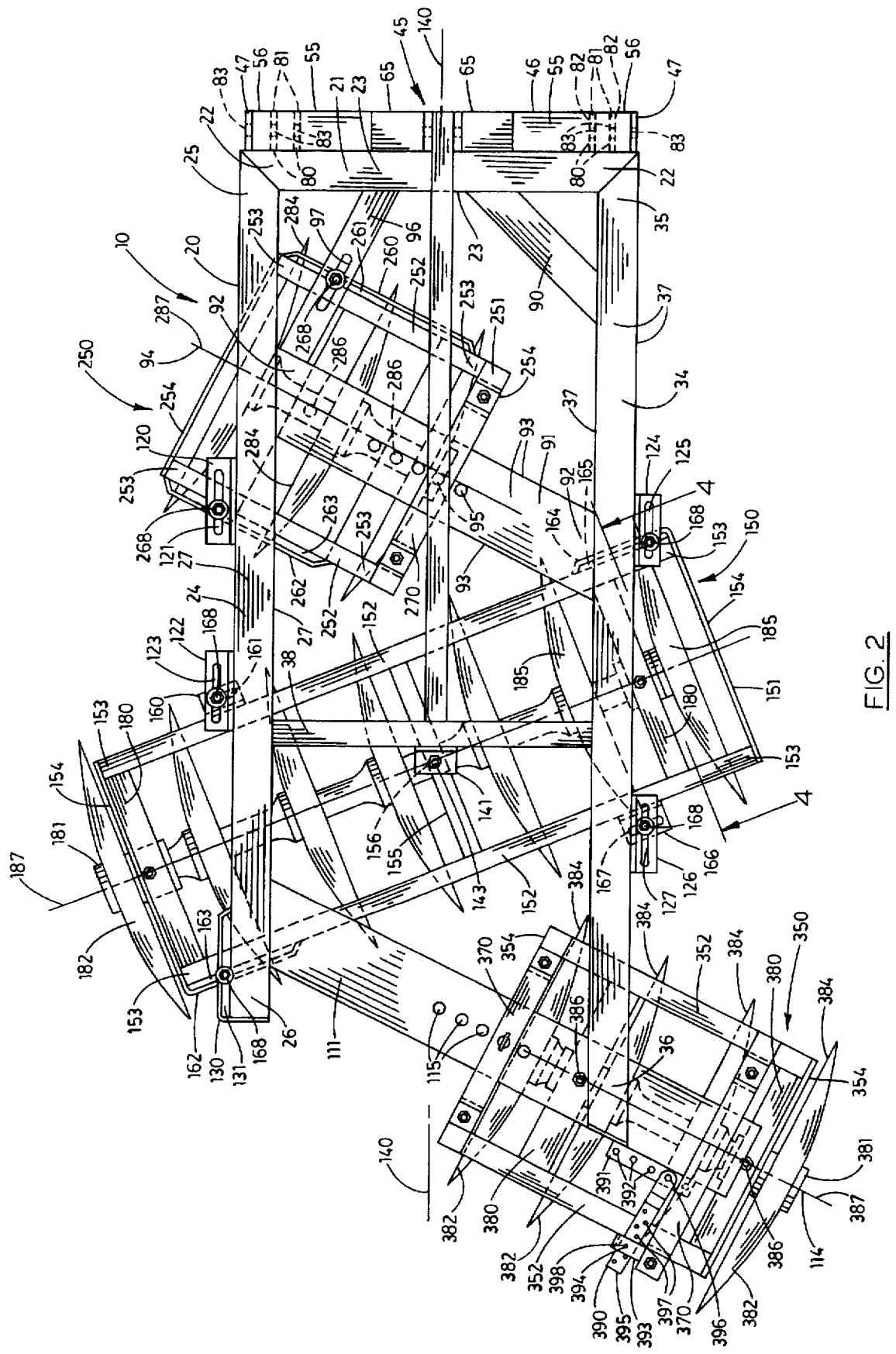
FIG. 2 is a top plan view of the implement of FIG. 1.

A second longitudinal frame member 34 is mounted by its proximal end portion 30 on the opposite end portion 22 of the forward transverse frame member. The second longitudinal frame member is disposed in right angular relation to the forward transverse frame member and extends in parallel relation to the first longitudinal frame member 24 to a distal end portion 36. The second longitudinal frame member, in the preferred embodiment, is also a steel box beam. The second longitudinal frame member has side surfaces 37. As shown in FIG. 2, the distal end portion 36 of the second longitudinal frame member extends rearwardly from the forward transverse frame member 21, relative to the intended direction of travel of the implement a greater distance than does the distal end portion 26 of the first longitudinal frame member 24. A rearward transverse frame member 38, having opposite end portions 39, is mounted on and interconnects the first longitudinal frame member 24 and the second longitudinal frame member 34 in right angular relation thereto in a predetermined position parallel to the forward transverse frame member 21. The rearward transverse frame member 38 has side surfaces 40 and is also preferably a steel box beam.

A mounting assembly 45 is mounted on the forward transverse frame member 21 of the main frame 20 by welding. The mounting assembly has a forward frame 46 including a pair of end plates 47 mounted by welding on the forwardly facing side surface 23 of the forward transverse frame member disposed in spaced, vertical and parallel relation. The end plates have corresponding upper end portions 48 and opposite lower end portions 49.

A pair of convergent frame members 55 is individually mounted on the interior sides of the end plates 47 by welding and extend convergently, upwardly therefrom from lower end portions 56 to upper end portions 57. The upper end portions 57 are welded to each other in abutted engagement. Each of the convergent frame members has side surfaces 58. As can be seen in the drawings, the convergent frame members are, in the preferred embodiment, steel box beams.

A pair of mounting brackets 65, having lower portions 66 and vertical portions 67, is mounted by welding of the lower portions thereof on the side surfaces 58 of the convergent frame members. The mounting brackets are mounted so that the vertical portions 67 thereof extend upwardly in spaced, substantially parallel relation to each other. The vertical portions have corresponding bolt holes 68 extending therethrough. A central frame member 69 has a lower end 70 and an opposite upper end portion 71. The lower end portion of the central frame member is mounted by welding on the side surface 40 of the rearward transverse frame member 38. The upper end portion 71 has a bolt hole 72 extending therethrough and is releasably mounted in the space between the vertical portion 67 of the mounting brackets by a bolt 73 extending through selected bolt holes 68 and the bolt holes 72.

Four interior mounting plates 80 are mounted by welding in spaced 2 relation to each other and in adjacent spaced relation to the end plates 47 extending in vertically spaced parallel relation. Each of the interior mounting plates has an upper end portion 81 and an opposite lower end portion 82. Bolt holes 83 extend through the lower end portions 82 of the interior mounting plates 80 and end plates 47 defining a common axis disposed in spaced, parallel relation to the forward transverse frame member 21.

A diagonal frame member 90 is mounted by welding on and interconnects the forward transverse frame member 21 and the second longitudinal frame member 34 extending diagonally therebetween. As shown in the drawings, the diagonal frame member is, in the preferred embodiment, a steel box beam. A forward transverse tubular beam 91 has opposite end portions 92. The forward transverse tubular beam is mounted on and interconnects the first longitudinal frame member 24 and the second longitudinal frame member 34. The forward transverse tubular beam has side surfaces 93 and extends along a longitudinal axis 94 shown in FIG. 2 at an oblique angle relative to the main frame 20. In the preferred embodiment, the forward transverse tubular beam 91 is a steel box beam of greater width than height. The upper surface of the forward transverse tubular beam has a plurality of locking pin holes 95 extending thereinto along the longitudinal axis 94 in spaced relation. A support plate 96 is mounted by welding so as to interconnect the side surface 93 of the forward transverse tubular beam and the side surface 23 of the forward transverse frame member disposed at right angles to the longitudinal axis 94 of the forward transverse tubular beam 91. A slot 97 extends through the support plate 96 defining a longitudinal axis also at right angles to the longitudinal axis 94.

A rearward transverse tubular beam 111, having opposite end portions 112, is mounted on and interconnects the distal end portion 26 of the first longitudinal frame member 24 and the distal end portion 36 of the second longitudinal frame member 34, as best shown in FIG. 2. The opposite end portion 112 mounted on the distal end portion 36 of the second longitudinal frame member 34 extends laterally of the second longitudinal frame member a predetermined distance. The rearward transverse tubular beam has opposite side surfaces 113 and, in the preferred embodiment, is a steel box beam having a greater width than height, as can best be visualized in FIG. 1. The rearward transverse tubular beam is oriented along a longitudinal axis 114 which is preferably parallel to the longitudinal axis 94 of the forward transverse tubular beam 91. A plurality of locking pin holes 115 extend into the rearward transverse tubular beam in spaced relation to each other and are aligned with the longitudinal axis 114 thereof.

A forward left support bracket 120 is mounted by welding on the side surface 27 of the first longitudinal frame member 24 in a predetermined position which can best be visualized upon reference to FIG. 2. A slot 121 extends through the forward left support bracket defining an axis parallel to the first longitudinal frame member 24. A rearward left support bracket 122 is mounted on the side surface 27 of the first longitudinal frame member 24 in spaced relation to the forward left support bracket 120. A slot 123 extends through the rearward left support bracket and extends along an axis defined by the slot 121 of the forward left support bracket. A forward right support bracket 124 is mounted on the side surface 37 of the second longitudinal frame member 34 in a predetermined position, as can best be visualized upon reference to FIG. 2. A slot 125 extends through the forward right support bracket and defines a longitudinal axis parallel to the side surface 37. A rearward right support bracket 126 is mounted on the side surface 37 of the second longitudinal frame member in predetermined spaced relation to the forward right support bracket 124. A slot 127 extends through the rearward right support bracket and extends along the axis defined by the slot 125 of the forward right support bracket.

A support plate 130 is mounted on the distal end portion 26 of the first longitudinal frame member 24 and is welded in position to define a slot 131 extending therethrough extending along the outer side surface 27 of the first longitudinal frame member.

Figure 3:
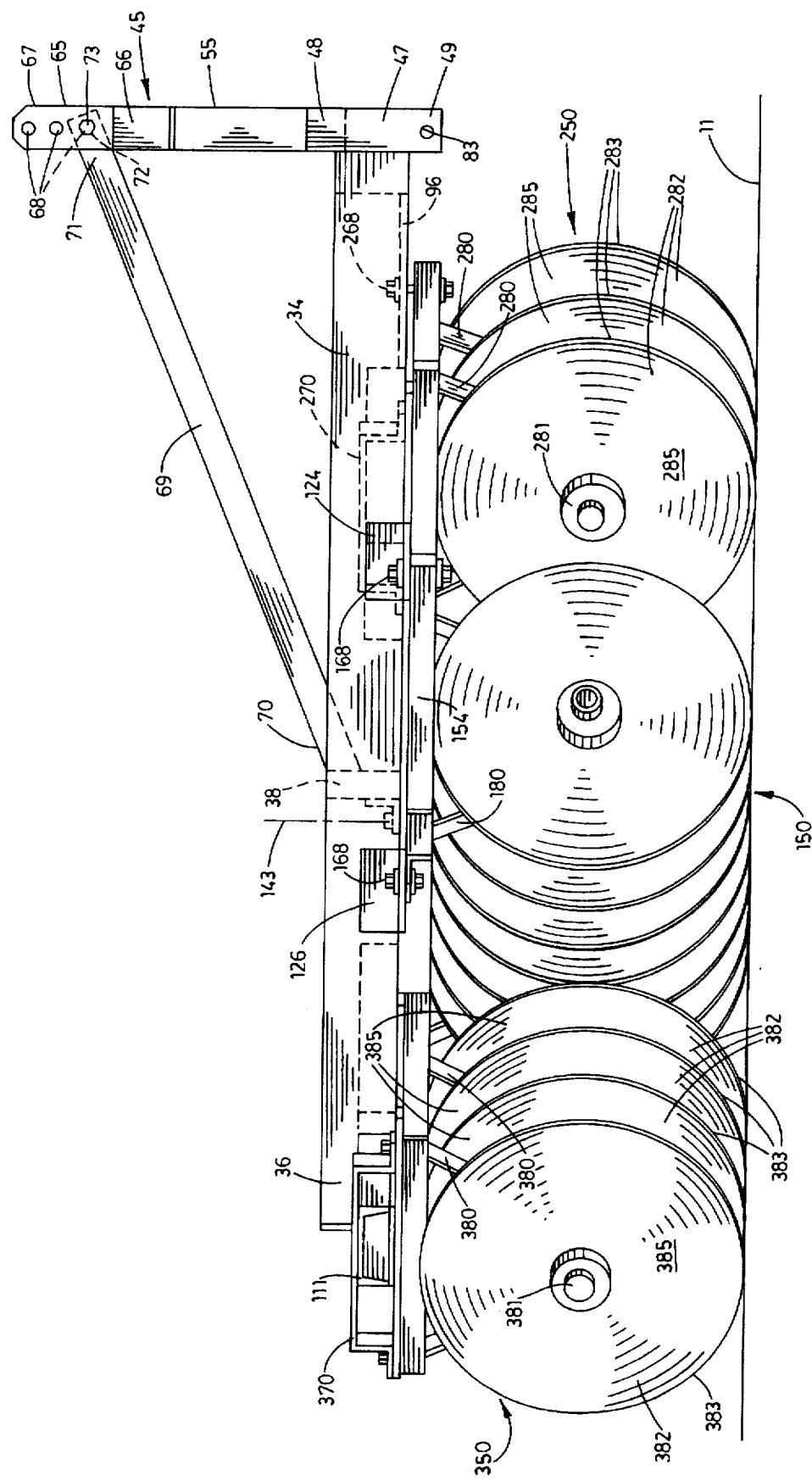
FIG. 3 is a side elevation of the implement of FIG. 1.

As shown in FIG. 2, the main frame 20 is oriented along a longitudinal axis 140. A central support bracket 141 is mounted by welding on the rearward side surface 40 of the rearward transverse frame member 38 centrally thereof. A bolt hole 142 extends through the central support bracket and defines a pivot axis 143 shown in FIG. 3.

First Earth Working Tool

A first earth working tool 150 is mounted on the main frame 20 for pivotal movement about the pivot axis 143, as may best be visualized in FIG. 2. The first earth working tool has a subframe 151 including a pair of parallel subframe members 152 which have opposite end portions 153. End plates 154 are mounted by welding on and interconnect corresponding opposite end portions 153 of the parallel subframe members 152. A central plate 155 is mounted by welding on and interconnects the parallel subframe members midway between the end plates 154. The central plate has a bolt hole 156 extending therethrough. A bolt nut assembly 157 extends through the bolt hole 156 and the bolt hole 142 of the central support bracket to mount the first earth working tool for pivotal movement about the pivot axis 143 and operable to be tightened down to secure the first earth working tool in any pivotal position about the pivot axis 143.

A front left side bracket 160 is mounted on the parallel subframe 152 on the right, as viewed in FIG. 2. A slot 161 extends through the front left side bracket defining an axis parallel to the subframe member 152 on which it is mounted. A rear left side plate 162 is mounted by welding on and interconnects the opposite end portions 153 of the parallel subframe members 152 and extends around and along a course parallel to the subframe member 152 on the left, as viewed in FIG. 2, and is weldably secured thereon. The rear left side plate defines a slot 163 defining an axis which is parallel to its respective parallel subframe member 152. A front right side plate 164 is mounted by welding on the other opposite end portions 153 of the subframe members 152 and extends around the subframe member on the right, as viewed in FIG. 2, and is secured by welding thereon so as to define a slot 165 extending along an axis parallel to its respective subframe member 152. A rear right side bracket 156 is mounted by welding on the subframe member 152 on the left, as viewed in FIG. 2, in a predetermined position and has a slot 167 extending therethrough defining an axis parallel to its respective subframe member 152.

A plurality of bolt and nut assemblies 168 are individually extended through and adjustably secured on the rearward left support bracket 122 and its respective front left side bracket 160, the support plate 130 and its respective rear left side plate 162, the forward right support bracket 124 and its respective front right side plate 164 and the rearward right support bracket 126 and its respective rear right side bracket 156. Thus, it will be seen that the first earth working tool 150 is mounted on the main frame 20 by the bolt and nut assemblies 168 in depending relation permitting the bolt and nut assemblies to be loosened and the first earth working tool to be pivoted about the pivot axis 143 as permitted by the slidable interconnection of the respective brackets and support plates heretofore described. Once the desired position is achieved, the bolt and nut assemblies 168 are tightened so as to secure the first earth working tool in the selected position.

Figure 4:
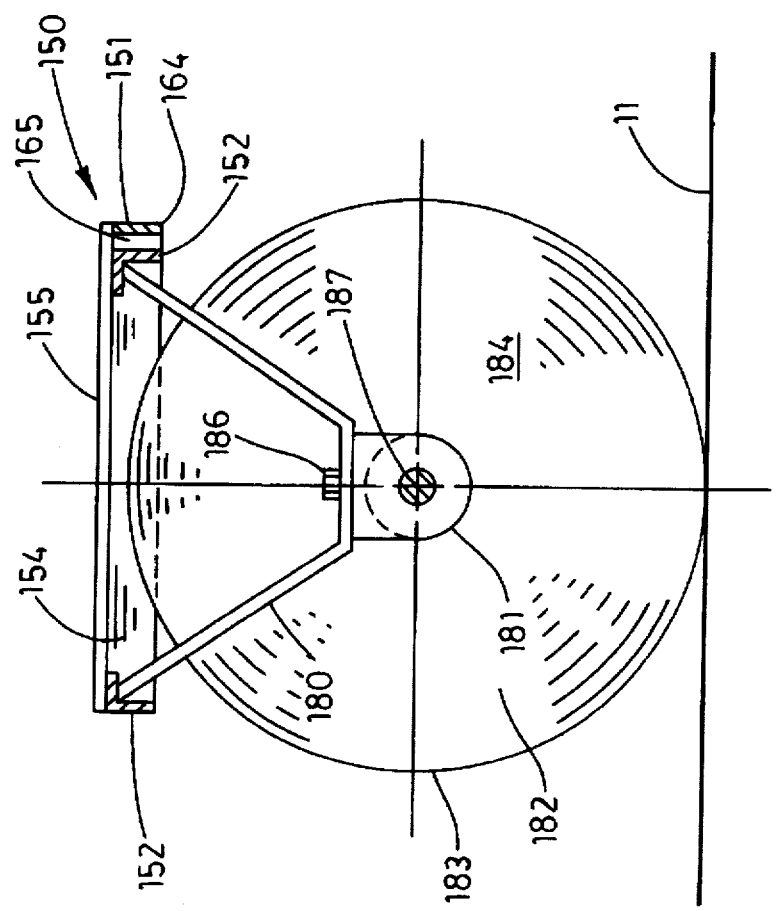
FIG. 4 is a transverse vertical section of the first earth working tool taken from a position indicated by line 4—4 in FIG. 2.

A pair of mounting frames 180 are mounted on and extend beneath the subframe members 152. An axle assembly 181, including appropriate bearings, an axle and the like, is mounted on and interconnects the mounting frames as shown best in FIG. 4. A plurality of plow blades 182 are mounted on the axle assembly in rotational relation spaced from each other, as shown in FIG. 2. Each of the plow blades has a sharpened peripheral edge 183, a concave surface 184 and an opposite convex surface 185. Bolt assemblies 186 mount the axle assembly 181 on the mounting frames 180 for rotation of the axle assembly and the plow blades borne thereby about an axis of rotation 187.

Second Earth Working Tool

A second earth working tool 250 is mounted in depending relation on the main frame 20, as best shown in FIG. 2. The second earth working tool has a subframe 251 including a pair of parallel subframe members 252 each having opposite end portions 253. The corresponding opposite end portions 253 of the parallel subframe members are interconnected by end plates 254 welded on and extending therebetween.

A front side plate 260 is mounted by welding on the subframe member 252 on the right, as viewed in FIG. 2, and extends to the opposite end portion 253 nearest the first longitudinal frame member 24 to define a slot 261 parallel to the subframe member 252. A rear side plate 262 is mounted by welding on the subframe member 252 on the left, as viewed in FIG. 2, and extends along the subframe member to the opposite end portion 253 thereof extending laterally of the first longitudinal frame member 24 to define a slot 263 which is parallel to slot 261. A pair of bolt and nut assemblies 268 is individually extended through the slot 97 of the support plate 96 and the slot 261 of the front side plate. A bolt and nut assembly 268 is also extended through the slot 121 of the forward left support bracket 120 and the slot 263. Thus, it will be seen that the end of the second earth working tool 250 nearest the first longitudinal frame member 224 is supported in depending relation on the bolt and nut assemblies 268.

The opposite end of the second earth working tool 250 is mounted in depending relation on the forward transverse tubular beam 91 by an adjustable support assembly 270. The adjustable support assembly includes a base plate 271 mounted on the upper surfaces of the subframe members 252 nearest the longitudinal axis 140 of the main frame 20. A support bracket 272 is mounted by bolts 273 on the base plate 271 extending about the forward transverse tubular beam 91. More specifically, the support bracket 272 defines a passage 274 through which the forward transverse tubular beam 91 extends, as best shown in FIG. 1. A locking pin hole 275 extends through the support bracket 272. A locking pin 276 is releasably adapted to be extended through the locking pin hole 275 and into a selected one of the locking pin holes 95, as will hereinafter be described in greater detail.

A pair of mounting frames 280 is mounted by welding on and interconnect the subframe members 252 in spaced relation to each other. An axle assembly 281, including appropriate bearings, axle and the like, is mounted in depending relation on the mounting frames 280. The axle assembly mounts a plurality of plow blades 282 for rotational movement about the axle assembly. Each of the plow blades has a sharpened peripheral edge 283, a concave surface 284 and an opposite convex surface 285. The axle assembly and the plow blades borne thereby are mounted on the mounting frames 280 by bolt and nut assemblies 286. The axle assembly and plow blades are thereby mounted for rotation about an axis of rotation 287.

Third Earth Working Tool

A third earth working tool, generally indicated by the numeral 350, is mounted on the rearward transverse tubular beam 111, as best shown in FIG. 2. The third working tool has a subframe 351 including a pair of parallel subframe members 352 having corresponding opposite end portions 353. The corresponding opposite end portions 353 of the subframe members 352 are interconnected by end plates 354 welded so as to extend therebetween.

The third earth working tool 350 is mounted in adjustable depending relation on the rearward transverse tubular beam 111 by a pair of adjustable support assemblies 370, best shown in FIG. 1. Each adjustable support assembly includes a base plate 371 mounted by welding on and interconnecting the subframe members 352 in parallel relation to each other. A support bracket 372 is mounted on each of the base plates 371 by a pair of bolts 373. Each support bracket has a passage 374 through which the rearward transverse tubular beam 111 is extended. A locking pin hole 375 extends through the adjustable support assembly 370 nearest the longitudinal axis 140 of the main frame 20. A locking pin assembly 376 is releasably adapted to be extended through the locking pin hole 375 and a selected one of the locking pin holes 115.

A pair of mounting frames 380 is mounted by welding on and interconnect the subframe members 352 and mount an axle assembly 381, including appropriate bearings, axle and the like, on the mounting frames 380. The axle assembly mounts a plurality of plow blades 382 in spaced relation to each other. Each of the plow blades has a sharpened peripheral edge 383, a concave surface 384 and a convex surface 385. The axle assembly and the plow blades thereof are mounted on the mounting frames by bolt assemblies 386. The axle assembly and plow blades are mounted for rotation about an axis of rotation 387 parallel to the longitudinal axis 114 of the rearward transverse tubular beam 111.

The third earth working tool 350 has an attitude adjustment assembly 390 including a mounting plate 391 mounted by welding on the rear surface of the rearward transverse tubular beam 111. The mounting plate has a plurality of holes 392 extending therethrough in spaced relation to each other, as best shown in FIG. 2. A side frame 393 is mounted on the base plate 374 and has a hole 394 extending therethrough. An adjustment arm 395 is pivotally mounted on the mounting plate 391 at pivot point 396. A plurality of holes 397 extend through adjustment arm 395 in predetermined positions. A locking pin 398 is adapted releasably to be inserted through the hole 394 of the slide frame and a selected one of the holes 397 of the adjustment arm for purposes hereinafter to be described.

Operation

The operation of the described embodiment of the present invention is believed to be readily apparent and is briefly summarized at this point. The normal direction of travel of the implement 10 borne by a tractor, as will hereinafter be described, is from left to right as viewed in FIG. 2 along the longitudinal axis 140.

The mounting and adjustment of the first earth working tool 150 has already been described. The mounting and adjustment of the second earth working tool 150 is achieved in a somewhat different manner. The locking pin 276 can be released from the locking pin hole 95 in which it is received by pulling upwardly thereon. This permits the second earth working tool slidably to be moved along the forward transverse tubular beam 91 when the bolt and nut assemblies 268 are loosened. This permits the second earth working tool to be adjusted along the longitudinal axis 94 of the forward transverse tubular beam to any desired position permitted by an available locking pin hole 95. The locking pin 276 is then simply reinserted into the selected locking pin hole 95 again releasably to interconnect the second earth working tool and the forward transverse tubular beam for pivotal movement about the axis defined by the locking pin 276. With the bolt and nut assemblies 268 loosened, the second earth working tool can be pivoted relative to the selected locking pin position as permitted by the slidable interconnection of the support plate 96 and the front side plate 260 and the forward left support bracket 120 and its respective rear side plate 262. Once the desired attitude of the second earth working tool has been achieved, the bolt and nut assemblies are again tightened into position to mount the earth working tool in the selected attitude.

Similarly, the third earth working tool 350 can be adjusted on the rearward transverse tubular beam 111. This is achieved by pulling upwardly on the locking pin 376 to remove the locking pin from the locking pin hole 115 within which it is received for selection of a new locking pin hole. The third earth working tool is then slidably moved along the rearward transverse tubular beam 111 as permitted by the slidable movement of the support brackets 372 along the rear transverse tubular beam 111. When the desired position for the third earth working tool along the longitudinal axis 387 has been achieved, the locking pin 376 is again inserted into the selected locking pin hole 115 to mount the third earth working tool for pivotal movement about an axis defined by the locking pin 376.

Pivotal positioning of the third earth working tool 350 about the selected position of the locking pin 376 is achieved by releasing the locking pin 398 and permitting the adjustment arm 395 to slide outwardly or inwardly in the slide frame 393. This causes the third earth working tool to be pivoted about the axis defined by the locking pin 376 to the desired attitude relative thereto as permitted by the pivot point 396. When the desired position has been achieved, the locking pin 398 is again inserted through the desired hole 397 of the adjustment arm 395 releasably to secure the third earth working tool in the selected position.

Once the implement 10 is adjusted to the precise configuration desired using the aforementioned methods, it is ready for use. The implement is mounted on a bearing vehicle for earth traversing movement. In the preferred embodiment, the bearing vehicle is preferably a tractor having a conventional A-frame, not shown, on which the mounting assembly 45 of the implement is secured. In accordance with conventional practice, this is achieved by attaching the A-frame to the mounting assembly using tire bolt holes 83 of tire end plates 47 and interior mounting plates 80 and the vertical portion 67 of the mounting brackets 65 using the bolt hole 68. Interconnection is accomplished using appropriate bolts or pins, not shown. The hydraulic system of the tractor can then be employed to raise and lower the implement 10 using the A-frame to lift the implement through positions of parallelism to tire earth's surface. Alternatively, the implement can simply be drawn behind the tractor with a portion, or all, of the weight of the implement rested on the earth's surface 11.

Upon reaching the work site, the implement is placed in engagement with the earth's surface 11 and, as may be necessary or desirable, as the tractor moves along a path of travel for use of the implement, the hydraulic system of the tractor applies the desired amount of downward pressure to the implement so that the plow blades 182, 282 and 382 of the respective first earth working tool 150, second earth working tool 250 and third earth working tool 350 are drawn into the soil. Because of the considerable weight of the implement 10 and the use of the plow blades heretofore described, the plow blades can be drawn downwardly into the soil to a depth reaching the axle assemblies 181,281 and 381 of the respective first, second and third earth working tools. Thus, the soil is worked at depth.

As can, perhaps, best be visualized in FIG. 2, the implement 10 is operable to return the soil, during a single pass, to the ambient grade and distribution. Referring then to FIG. 2, it will be seen that the second earth working tool 250, in the adjusted relationship shown therein, turns the soil in a swath extending from just to the right of the longitudinal axis 140, relative to the direction of travel, to the left and to a position laterally disposed to the left of the first longitudinal frame member 24. Since the concave surfaces 284 of the plow blades 282 face to the left, it may be visualized that the soil is turned from the leading portion of the peripheral edge of the plow blade on the far right of the first earth working tool, relative to the direction of travel of the implement, to the trailing edge of the portion of the peripheral edge of the plow blade on the far left relative to the direction of travel. This causes the soil to be rolled, or turned, from the concave surface of each plow blade to the left thereof. Thus, it may be visualized that the soil turned in the swath of movement forms a rectilinear path extending from the trailing edge of the peripheral edge of the plow blade on the right to a position laterally disposed to the left relative to the trailing edge of the peripheral edge of the plow blade on the left, as viewed therein.

Conversely, the first earth working tool 150 turns the soil from the left to right relative to the direction of travel of the implement. As viewed in FIG. 2, the leading edge of the peripheral edge of the plow blade 182 on the far left thereof is laterally disposed to the left relative to the soil turned by the first earth working tool 250. Thus, the soil turned by the second earth working tool is collected by the left portion of the first earth working tool and returned to its original position while being turned a second time. On the other hand, the soil engaged by the plow blades to the right of the longitudinal axis 140 of the main frame is turned from left to right, as viewed in FIG. 2. Much of this soil was not engaged by the second earth working tool 250, but is initially turned by the plow blades of the first earth working tool. The swath produced by the plow blades of the first earth working tool may be viewed as extending from the trailing edge of the peripheral edge of the plow blade 182 on the left, as viewed in FIG. 2, to a position laterally disposed to the right relative to the trailing edge of the plow blade 182 on the right, as viewed in FIG. 2. Thus, it will be seen that, upon leaving the first earth working tool, the soil to the left of the longitudinal axis 140 of the main frame is returned to substantially an ambient grade and distribution.

The third earth working tool 350 engages the soil in a swath extending from the leading edge of the peripheral edge of the plow blade 382 on the right relative to the direction of travel of the implement, as viewed in FIG. 2, to the trailing edge of the peripheral edge of the plow blade 382 on the left. Thus, the soil that has been initially turned once by the portion of the first earth working tool 150 to the right of the longitudinal axis 140 is turned from right to left back toward the longitudinal axis 140. As a consequence, the soil to the right of the longitudinal axis 140 is returned substantially to an ambient grade and distribution.

When the operation of the implement 10 is viewed as a whole, it will be seen that in a single pass, the implement turns the soil at depth thoroughly and evenly in a swath extending from the leading edge of the peripheral edge of the plow blade 182 on the far left relative to the direction of travel and as viewed in FIG. 2, to the leading edge of the plow blade 382 on the far right. Within this swath, the soil is thoroughly and evenly comminuted while being returned to an ambient grade and distribution in a single pass.

Furthermore, as noted, the first longitudinal frame member 24 and second longitudinal frame member 34 are, in the preferred embodiment, box beams which, in combination with the brackets 270 and 370 extending thereabout, apply substantial leverage to counteract the tremendous torque applied by the second and third earth working tools thereto during use. Similarly, the other mounting assemblies mounting the first and second earth working tools resist such torque during operation of the implement.

Therefore, the implement of the present invention obviates the difficulties associated with the use of conventional earth working equipment; is operable dependably to work the soil at depth during use thereof; works the soil thoroughly and evenly to convert the soil to a substantially uniform consistency during a single pass; returns the soil substantially to its ambient grade and distribution; is dependably and readily adjusted to particular working configurations; and which is otherwise entirely effective in achieving its desired operational objectives.

Although the invention has been herein shown and described in what is conceived to be the most practical and preferred embodiments, it is recognized that departures may be made therefrom within the scope of the invention which is not to be limited to the illustrative details disclosed.

Having described my invention, what I claim as new and desire to secure by Letters Patent is:

1. An earth working implement comprising a frame adapted to be transported in earth traversing movement along a predetermined path of travel and having a longitudinal axis of reference substantially aligned with said path of travel, said frame having a pair of substantially parallel longitudinal frame members disposed in spaced relation to each other substantially equal distances on opposite sides of said longitudinal axis of reference of the frame interconnected in fixed relation by a pair of transverse beams; a first earth working tool mounted on the frame disposed for engagement with the earth during said earth traversing movement and operable to move earth laterally of said path of travel and wherein the first earth working tool has a primary operative position in which the first earth working tool extends substantially equal distances on opposite sides of said longitudinal axis of reference; a second earth working tool mounted on the frame forwardly of the first earth working tool relative to said path of travel disposed for engagement with the earth during said earth traversing movement and operable to move earth laterally of said path of travel and wherein the second earth working tool has a primary operative position having a longitudinal axis of reference extending a predetermined distance to one side of said longitudinal axis of reference that is substantially aligned with said path of travel; a third earth working tool mounted on the frame rearwardly of the first earth working tool relative to said path of travel and disposed for engagement with the earth during said earth traversing movement and operable to move earth laterally of said path of travel and wherein the third earth working tool has a primary operative position having a longitudinal axis of reference extending a predetermined distance to a side of said longitudinal axis of reference opposite to that of said primary operative position of the second earth working tool and a distance unequal thereto whereby said pair of transverse beams of said frame are disposed at oblique angles substantially aligned with said longitudinal axes of reference of the respective primary operative positions of the second and third earth working tools; means mounting said second and third earth working tools in individually supported relation on their respective transverse beams; and a plurality of axially aligned plow blades, each of which has opposite concave and convex surfaces, mounted on the first, second and third earth working tools and adapted during said earth traversing movement to engage the earth and to turn the earth, so engaged, generally to the side of said longitudinal axis of reference of the frame to which said concave surfaces face and wherein the directions of movement of the earth laterally of said path of travel by the first, second and third earth working tools is such as to work the earth substantially evenly and to return the earth thereafter to a substantially ambient distribution.

2. The implement of claim 1 wherein the second and third earth working tools individually have subframes and said mounting means includes at least one bracket mounted on each of the subframes of the second and third earth working tools and extending about their respective transverse support beams for individual slidable movement of the second and third earth working tools therealong, a plurality of holes extending through their respective transverse beams aligned along paths aligned with said longitudinal axes of reference of said second and third earth working tools and means for releasably interlocking the second and third earth working tools on their respective transverse support beams to permit laterally adjustable movement of the second and third earth working tools relative to the longitudinal axis of reference of said frame.

3. The implement of claim 2 wherein each of the transverse beams of said pair of transverse beams and its respective bracket have surfaces engaging each other substantially to prevent pivoting of its respective second or third earth working tool about said transverse beam during said earth traversing movement.

4. The implement of claim 3 wherein said brackets individually define openings wider than the transverse dimensions of their respective transverse beams to permit lateral movement of the subframes of the second and third earth working tools on their respective transverse beams relative to said individual longitudinal axes of reference thereof and means for individually selectively fixing said subframes in predetermined operative positions relative to said longitudinal axes of reference.

5. The implement of claim 4 wherein said fixing means includes adjustable securing means individually interconnecting the frame and the subframes of the respective second and third earth working tools operable to permit the respective subframes to be pivoted about their respective fixing means to selected alternate operative positions deviated from their respective primary operative positions and releasably to be fixed in said selected alternate operative positions.

6. The implement of claim 5 wherein said fixing means includes a spring loaded locking pin operable releasably to interlock each bracket with a selected hole of its respective transverse beam.

7. The implement of claim 6 wherein said securing means include plates individually mounted on the frame and adapted individually releasably to be interlocked with the subframes of their respective second and third earth working tools at positions eccentric to their respective locking pins so as selectively to permit the second and third earth working tools individually to be pivotally adjusted thereabout.

8. The implement of claim 7 including means mounted on the frame for permitting substantially pivotal movement of the first earth working tool about a pivot axis substantially coincident with and right-angularly related to said longitudinal axis of reference of said frame and means for releasably fixing the first earth working tool in a selected operative position about said pivot axis.

9. The implement of claim 8 wherein said means for releasably fixing includes a first pair of interlockable assemblies supporting the first earth working tool on the frame in depending relation at points eccentric to said pivot axis for substantially slidable adjustment of the first earth working tool about the pivot axis along courses substantially parallel to said longitudinal axis of reference of the frame and a second pair of interlockable assemblies supporting the first earth working tool on the frame in depending relation at points eccentric to said pivot axis for substantially slidable adjustment of the first earth working tool about the pivot axis along at least a pair of intersecting courses.

10. The implement of claim 9 wherein one of said first pair of interlockable assemblies and one of said second pair of interlockable assemblies is mounted on the frame laterally disposed relative to the longitudinal axis of the frame.

* * * * *

UNITED STATES PATENT AND TRADEMARK OFFICE
CERTIFICATE OF CORRECTION

PATENT NO. : 5,628,373
DATED : May 13, 1997
INVENTOR(S) : Bernard O. Domries

It is certified that error appears in the above-identified patent and that said Letters Patent is hereby corrected as shown below:

Column 1, Line 36, delete "rise" and substitute ---use---.

Column 2, Line 62, delete "tile" and substitute ---the---.

Column 2, Line 64, delete "tile" and substitute ---the---.

Column 4, Line 51, delete "2".

Column 4, Line 66, delete "tile" and substitute ---the---.

Column 4, Line 67, delete "tile" and substitute ---the---.

Column 9, Line 48, delete "tire" and substitute ---the---.

Signed and Sealed this

Twenty-second Day of July, 1997

Attest:

BRUCE LEHMAN

Attesting Officer

Commissioner of Patents and Trademarks